United States Patent Office 3,159,661
Patented Dec. 1, 1964

3,159,661
PHENAZASILINE COMPOUNDS
Robert E. Jones, North Muskegon, Mich., and David
Wasserman, Springfield, N.J., assignors to Merck & Co.,
Inc., Rahway, N.J., a corporation of New Jersey
No Drawing. Filed Aug. 1, 1961, Ser. No. 128,397
24 Claims. (Cl. 260—448.2)

This invention relates to antioxidants for high-temperature lubricants and, more particularly, to a process for making derivatives of phenazasiline.

Compounds of the phenazasiline have been found to be useful as antioxidant high-temperature lubricants, particularly those of the synthetic ester type. However, the lack of methods for preparing phenazasilines in large quantities has retarded the use of such compounds and the development of high-temperature synthetic lubricants which are capable of withstanding high temperatures.

In our copending application U.S. Serial No. 836,928 by Jones and Wasserman, filed August 31, 1959, now U.S. Patent 3,065,251, issued November 20, 1962, there is described a new process for the formation of phenazasiline derivatives such as 5-ethyl-10,10-diphenylphenazasiline (hereinafter referred to as 5–10–10). In the manufacture of 5–10–10 according to the process described in the aforementioned copending application, an intermediate 2,8-dibromo-5-ethyl-10,10-diphenylphenazasiline is used. In the present invention, there is described the preparation of novel compounds in the phenazasiline class useful as antioxidants using as the starting material the aforementioned intermediate compound.

An object of the present invention is to provide novel compounds in the phenazasiline class.

Another object of this invention is to provide methods of preparing phenazasiline derivatives.

These and other objects appear more fully in the disclosure which follows.

According to the present invention there is provided a new and improved process for making phenazasiline derivatives having the general formula:

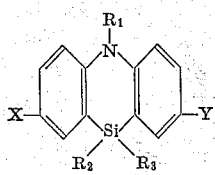

where $R_1$ is a lower alkyl radical and $R_2$ and $R_3$ are radicals selected from the group consisting of lower alkyl and phenyl and X and Y are selected from the group consisting of hydrogen, alkyl, cycloalkyl, aralkyl, phenyl, carboxyl and salts thereof.

In addition phenazasiline polymers having the formula:

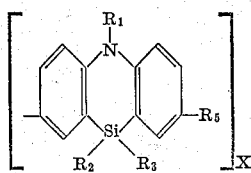

where $R_1$, $R_2$ and $R_3$ are as previously defined, $R_5$ is lower alkylene and X ranges from 2–50 are described herein.

Novel phenazasiline intermediates having the general formula:

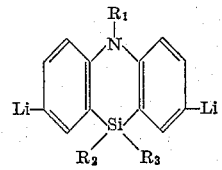

where $R_1$, $R_2$ and $R_3$, as previously defined, are formed according to this invention.

The following Flow Sheet A illustrates the preparation of the novel intermediate of the present invention by a process of lithiation of a dibromo precurser.

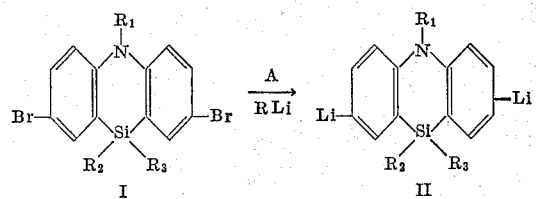

where R is a lower alkyl radical.

The starting material 2,8-dibromo-5,10,10-trihydrocarbon-substituted-phenazasiline I used herein is produced in the manner described in the aforementioned United States Patent No. 3,065,251. A specific illustration of this step is the reaction of 4,4'-dibromo-N-ethyl-2,2'-dilithiodiphenylamine with diphenyldichlorosilane to form 2,8-dibromo - 5 - ethyl-10,10-diphenylphenazasiline. 4,4'-dibromo-N-ethyl-2,2-dilithiodiphenylamine is prepared by reacting 2,2',4,4'-tetrabromo-N-(lower alkyl)-diphenylamine-4 with a lower alkyl lithium. The 2,2',4,4'-tetrabromo intermediate may be prepared by brominating diphenylamine and subsequently alkylating the 2,2',4,4'-tetrabromodiphenylamine thus produced.

The 2,8-dilithio derivative II is prepared according to the present invention by reacting 2,8-dibromo-5,10,10-trihydrocarbon substituted phenazasiline with about 2 moles of a straight chain lower alkyl lithium containing from 2 to 10 carbon atoms, such as butyl lithium, ethyl lithium, propyl lithium, pentyl lithium, hexyl lithium, and the like, at a temperature of about 10–25° C., and preferably about 15° C.

Other Flow Sheets B–E below illustrate the preparation of the compounds of the present invention using the dilithio intermediate compound II.

In Flow Sheet B there is shown the alkylation of a 2,8-dilithio phenazasiline to form the corresponding 2,8-dialkylated phenazasiline III, where $R_4$ is an alkyl, cycloalkyl, aralkyl or phenyl radical and X is chloro, bromo or iodo.

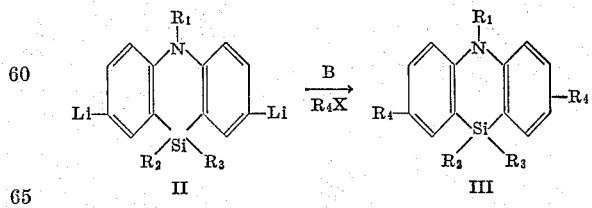

To illustrate a typical reaction, 2,8-dilithio-5-ethyl-10,10-diphenylphenazasiline may be converted to 2,8-dimethyl-5-ethyl - 10,10 - diphenylphenazasiline by reaction with methyl iodide or dimethylsulfate in ethyl ether.

In Flow Sheet C there is shown the preparation of phenazasiline derivatives where the 2- and 8-positions are both substituted by hydrogen by hydrolysis of both lithium ions in the dilithio intermediate.

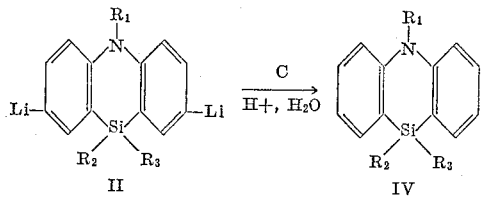

As another specific illustration of the reactions which the dilithio intermediate may undergo, there is shown the conversion in Flow Sheet D to the 2,8-dicarboxylic derivative of 5-10-10 by reacting II with carbon dioxide followed by acidification in aqueous solution. The dicarboxylic acid thus produced then may be converted to the salt, such as the metallic salt VI, by reaction with a metal hydroxide such as barium hydroxide, cadmium hydroxide, zinc hydroxide, calcium hydroxide, magnesium hydroxide, sodium hydroxide and the like, or a non-metallic salt such as ethylenediamine.

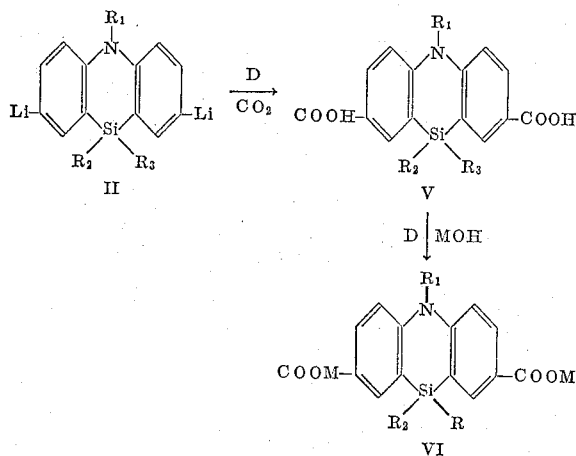

where $R_1$, $R_2$ and $R_3$ are as previously defined and M represents a metal.

Another reaction of the dilithio intermediate according to the present invention is the preparation of linear polymer derivatives of 5-10-10 as shown in Flow Sheet E, wherein dilithio intermediate is reacted with a difunctional reagent such as a dibromo or diiodo hydrocarbon, for example, ethylene dibromide, to produce the 2-alkyl-5-10-10-polymer VII.

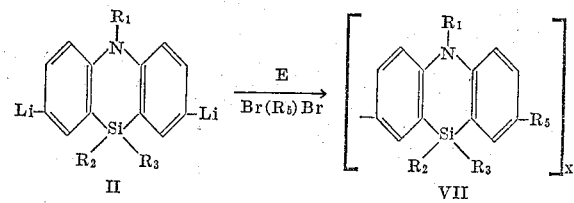

where $R_5$ is a lower alkylene group and $x$ ranges from 2–50.

In a typical reaction 2,8-dilithio-5-ethyl-10-10-diphenylphenazasiline is converted to 2-ethylene - 5 - ethyl-10,10-diphenylphenazasiline polymer in which X is about 30 by reaction with ethylene dibromide.

The invention will be illustrated in detail with respect to the specific examples which follow.

EXAMPLE 1

2,8-Dilithio-5-Ethyl-10,10-Diphenylphenazasiline

A suspension of 2,8-dibromo-5-ethyl - 10,10 - diphenylphenazasiline [42.8 g. (0.08 mole)] in 350 ml. of diethyl ether is placed in a 1-liter 3-neck flask equipped with stirrer, thermometer, condenser, and an addition funnel. A solution of n-butyl lithium, 0.673 N in diethyl ether, 262 ml. (0.176 mole) is then added at a pot temperature of 10° C. during 25 minutes. The suspension slowly goes into solution. After 30 minutes of heating at 12–15° C. a white precipitate is formed. A sample of the solution is tested for residual n-butyl lithium and is found to be free of the latter. Thereupon, an additional amount of the n-butyl lithium solution in diethyl ether is added. 47 ml. (0.032 mole) is then added at 10–15° C. and the mixture is held at 15° C. for one hour. At the end of the run, the test for alkyl lithium is negative. There is thus produced the compound 2,8-dilithio-5-ethyl-10,10-diphenylphenazasiline.

Using in turn the 5-methyl, 5-propyl, or 5-butyl substituted 2,8-dibromo-10,10-diphenylphenazasiline derivatives in place of the 5-ethyl compound in the procedure described above, there is produced the corresponding 2,8-dilithio-5-methyl, 5-propyl, or 5-butyl substituted compounds.

In a similar manner using 2,8-dibromo-5-ethyl-10,10-dimethylphenazasiline in the procedure described above, there is produced the corresponding 2,8-dilithio-5-ethyl-10,10-dimethylphenazasiline derivatives.

When the above procedure is carried out using the 10,10-diethyl derivative, there is produced the corresponding 2,8-dilithio derivative.

EXAMPLE 2

2,8-Dimethyl-5-Ethyl-10,10-Diphenylphenazasiline

To the compound formed in Example 1, there is added a solution of methyl iodide 35.2 g. (0.25 mole) in 20 g. of diethyl ether at 22–26° C. while cooling with cold water during 15 minutes. After another 15 minutes, a test for aryl lithium is still positive. After stirring for 16 hours, the test for aryl lithium is negative. The reaction mixture is then hydrolyzed by slowly adding 50 ml. of water and neutralizing with 46 ml. of 1 N sulfuric acid. A solid is precipitated and is then dissolved by the addition of 10 ml. of benzene. The organic layer is then washed with three 100 ml. portions of water. The solvent is then evaporated freely at 25° C. in a crystallizing dish, leaving 32.0 g. of crystals and 3.26 g. of amorphous solid which is separated manually from the crystals. The crystalline product melts at 147–156° C., which represents a 99% recovery of crude material. The product is purified by absorbing the crude crystal dissolved in 1200 ml. of warm hexane on a three-foot column containing 600 g. of acid washed alumina. The column is eluted with 6800 ml. of warm hexane to yield 29.1 g. of the product. After two recrystallizations each time from ten times the weight of hexane, a 16.1 g. yield (50%) of pure 2,8-dimethyl-5-ethyl-10,10-diphenylphenazasiline is obtained. M.P. 162.5–163° C. *Analysis.*—Calculated: C, 83.94, 8, 6.68. Found: C, 82.76, H, 6.43. The ultraviolet absorption curve showed the following maxima:

| λ | (E%) |
|---|---|
| 3360 | 137 |
| 3100 | 161 |
| 2880 | 400 |
| 2230 | 1096 |

When ethyl iodide and propyle iodide are used in place of methyl iodide in the above example, there is obtained 2,5,8-triethyl-10,10-diphenylphenazasiline and 2,8-dipropyl-5-ethyl-10,10-diphenylphenazasiline, respectively.

In a similar manner using phenyl iodide in place of methyl iodide, there is produced the corresponding 2,8-diphenyl-5-ethyl-10,10-diphenylphenazasiline derivative.

In a similar manner using cyclohexyl bromide in place of methyl iodide as above, there is produced the corresponding 2,8-dicyclohexyl-5-ethyl - 10,10 - diphenylphenazasiline derivative.

Using benzyl iodide, there is produced the corresponding 2,8-dibenzyl-5-ethyl-10,10-diphenylphenazasiline derivative.

EXAMPLE 3

5-Ethyl-10,10-Diphenylphenazasiline

A suspension of 2,8-dibromo-5-ethyl-10,10-diphenylphenazasiline, 10.7 g. (0.02 mole) in 150 ml. of diethyl ether is placed in a 500 ml. flask equipped with a thermometer, a Claisen adapter, stirrer, condenser and an adidtion funnel. The temperature is raised to the boiling point and the solution is cooled to 0° C. under nitrogen. Thereupon, a solution of n-butyl lithium (0.96 N) 45.8 ml. (0.044 mole) is added dropwise. Upon raising the temperature to 15° C. during 20 minutes, the 2,8-dibromo compound slowly goes into solution. After 45 minutes at 15–22° C., the color test for alkyl lithium is negative. The white suspension is treated with n-butyl lithium, 11.5 ml. of 0.96 N (0.011 mole) by slow addition at 10–15° C. After 30 minutes the alkyl lithium color test is observed to be positive, indicating a complete substitution of bromine by lithium. Thereafter, the suspension is poured onto 400 g. of ice water and neutralized with 0.016 mole of 1 N sulfuric acid. The ether layer is then washed with three 50-ml. portions of water and stripped of solvent by distillation in vacuo. The residue is observed to be free of bromide ion. The crude product is then recrystallized from isopropanol. After five recrystallizations, 2.0 g. of 5-ethyl-10,10-diphenylphenazasiline is obtained. M.P. 120.5–122° C. A mixed melting point with an authentic sample of the compound made by another route showed no depression of the melting point.

EXAMPLE 4

2,8-Dicarboxy-5-Ethyl-10,10-Diphenylphenazasiline

A suspension of 2,8-dibromo-5-ethyl-10,10-diphenylphenazasiline, 53.5 g. (0.1 mole) in 350 ml. of diethyl ether is placed in a one liter, three-neck flask equipped with a thermometer, stirrer, condenser and addition funnel. To this suspension is added, with stirring at a flask temperature of 10° C. during 25 minutes, a solution of n-butyl lithium (0.22 mole) in diethyl ether. The suspension slowly goes into solution. After 30 minutes at 12–15° C., a white preciiptate is formed and the color test for alkyl lithium is negative. The suspension of 2,8-dilithio-5-ethyl-10,10-diphenylphenazasiline is then poured in a two liter flask containing 100 g. (excess) of powdered solid carbon dioxide (Dry Ice) in 250 ml. of dry diethyl ether with rapid stirring. Stirring is continued until all the carbon dioxide is evolved. Then 200 ml. of water is added with stirring and the mixture is allowed to separate into two layers. The aqueous layer is heated to remove ether and then acidified with hydrochloric acid to precipitate 2,8-dicarboxy-5-ethyl-10,10-diphenylphenazasiline. The product is washed well with water and dried. It has a carboxylic acid equivalent weight of about 225.

The carboxylic acid produced above, 23.5 g., is redissolved in 200 ml. of hot acetone-methanol solution. Then 4.95 of freshly precipitated zinc hydroxide resuspensed in hot methanol is added thereto. After stirring for one hour the zinc salt of the dicarboxylic acid is isolated by evaporation of the solvents in vacuo. The residual solid is the zinc salt of 2,8-dicarboxy-5-ethyl-10,10-diphenylphenazasiline.

EXAMPLE 5

2,8-Dibutyl-5-Ethyl-10,10-Diphenylphenazasiline

The same procedure as in Example 4 is followed to prepare a suspension of 2,8-dilithio-5-ethyl-10,10-diphenylphenazasiline in diethyl ether. To this suspension is added 1,4-diiodobutane, 31.0 g. (0.1 mole) dropwise at 21° C. flask temperature during 30 minutes. After stirring at 25° C. for 16 hours, a test for aryl lithium is negative. The reaction mixture is then hydrolyzed by slow addition of 50 ml. of water and neutralized with 1 N sulfuric acid. The aqueous salt solution layer is then separated in a separatory funnel. The organic layer is washed twice with water and stripped of solvent. The residuel polymer in the organic layer is an amorphous mass which is quite soluble in polyester lubricant compositions.

We claim:
1. A process for preparing compounds having the formula

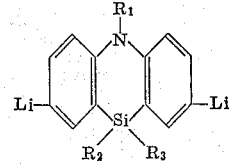

where $R_1$ is a lower alkyl radical and $R_2$ and $R_3$ are radicals selected from the group consisting of lower alkyl and phenyl which comprises intimately mixing a compound having the formula

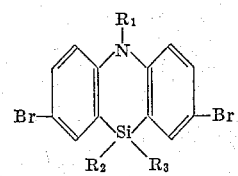

with a straight chain lower alkyl lithium containing from 2 to 10 carbon atoms.

2. A process for preparing 2,8-dilithio-5-ethyl-10,10-diphenylphenazasiline which comprises intimately mixing 2,8-dibromo-5-ethyl-10,10-diphenylphenazasiline with n-butyl lithium at a temperature in the range of 10–30° C.

3. A process for preparing compounds having the formula

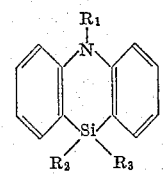

where $R_1$ is a lower alkyl radical and $R_2$ and $R_3$ are radicals selected from the group consisting of lower alkyl and phenyl which comprises intimately mixing a compound having the formula

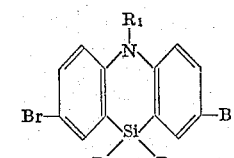

with a straight chain lower alkyl lithium containing from 2 to 10 carbon atoms and hydrolyzing said dilithio compound thus produced to form said compound.

4. A process for preparing 5-ethyl-10,10-diphenylphenazasiline which comprises reacting 2,8-dibromo-5-ethyl-10,10-diphenylphenazasiline with n-butyl lithium to form 2,8-dilithio-5-ethyl-10,10-diphenylphenazasiline and hydrolyzing said dilithio compound to form said compound.

5. A process for preparing compounds having the formula

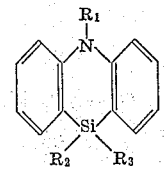

where $R_1$ is a lower alkyl radical and $R_2$ and $R_3$ are radicals selected from the group consisting of lower alkyl and phenyl which comprises reacting a compound having the formula

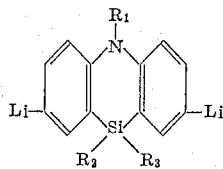

with water to form said product.

6. A process for preparing 5-ethyl-10,10-diphenylphenazasiline which comprises hydrolyzing 2,8-dilithio-5-ethyl-10,10-diphenylphenazasiline in aqueous solution to form said compound.

7. A process for preparing 2,8-dimethyl-5-ethyl-10,10-diphenylphenazasiline which comprises reacting 2,8-dibromo-5-ethyl-10,10-diphenylphenazasiline with n-butyl lithium to form 2,8-dilithio-5-ethyl-10,10-diphenylphenazasiline and treating said 2,8-dilithio compound with methyl iodide to form said product.

8. A process for preparing a compound having the formula

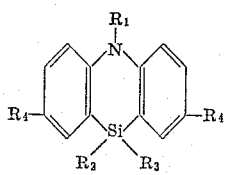

where $R_1$ is a lower alkyl radical and $R_2$, $R_3$ and $R_4$ are radicals selected from the group consisting of lower alkyl and phenyl, which comprises reacting a compound having the formula

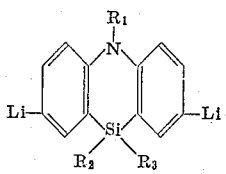

with $R_4X$ where X is selected from the class consisting of chloro, bromo and iodo to form said product.

9. A process for preparing 2,8-dimethyl-5-ethyl-10,10-diphenylphenazasiline which comprises alkylating 2,8-dilithio-5-ethyl-10,10-diphenylphenazasiline with dimethyl sulfate to form said product.

10. A process for preparing a compound having the formula

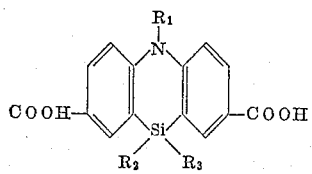

where $R_1$ is a lower alkyl radical and $R_2$ and $R_3$ are radicals selected from the group consisting of lower alkyl and phenyl which comprises reacting a compound having the formula:

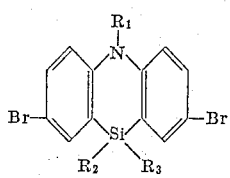

with a straight chain lower alkyl lithium containing from 2 to 10 carbon atoms to form the 2,8-dilithio substituted compound, treating said 2,8-dilithio compound with carbon dioxide and acidifying the resulting product.

11. A process for preparing 2,8-dicarboxylic-5-ethyl-10,10-diphenylphenazasiline which comprises reacting 2,8-dibromo-5-ethyl-10,10-diphenylphenazasiline with n-butyl lithium to form the 2,8-dilithio substituted compound and adding $CO_2$ to said compound to form the dicarboxylic acid lithium salt and acidifying said salt to form said dicarboxylic acid.

12. A process in accordance with claim 11 wherein said 2,8-dicarboxylic acid is neutralized to form a salt thereof.

13. A process in accordance with claim 12 wherein said salt is an ethylenediamine salt.

14. A process for preparing a compound having the formula

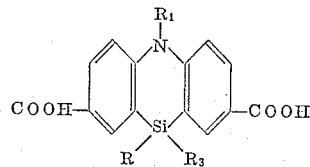

where $R_1$ is a lower alkyl radical and $R_2$ and $R_3$ are radicals selected from the group consisting of lower alkyl and phenyl which comprises treating a compound having the formula

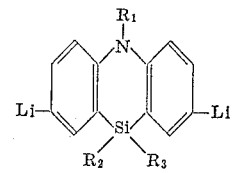

with carbon dioxide and acidifying the resulting product.

15. A process in accordance with claim 14 wherein said 2,8-dicarboxylic acid is neutralized to form a salt thereof.

16. A process in accordance with claim 15 wherein said salt is an ethylenediamine salt.

17. A process for preparing a polymeric compound having the formula

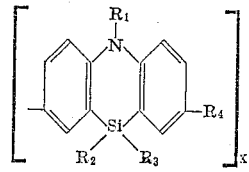

where $R_1$ is a lower alkyl radical and $R_2$ and $R_3$ are radicals selected from the group consisting of lower alkyl and phenyl and $R_4$ is a lower alkylene radical and $x$ ranges from 2–50, which comprises reacting a compound having the formula:

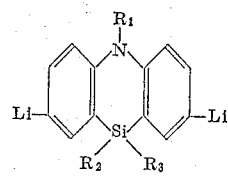

where $R_1$, $R_2$ and $R_3$ are as previously defined with a difunctional reagent ZRZ, where Z is selected from the group consisting of bromo and iodo, and R is a loweralkylene radical.

18. A compound having the formula

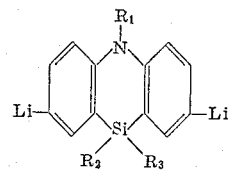

where $R_1$ is a lower alkyl radical and $R_2$ and $R_3$ are radicals selected from the group consisting of lower alkyl and phenyl.

19. 2,8-dilithio-5-ethyl-10,10-diphenylphenazasiline.
20. A compound having the formula

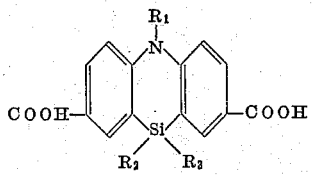

where $R_1$ is a lower alkyl radical and $R_2$ and $R_3$ are radicals selected from the group consisting of lower alkyl and phenyl.

21. 2,8-dicarboxylic acid 5-ethyl - 10,10 - diphenylphenazasiline.

22. A compound having the formula

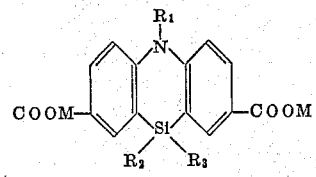

where $R_1$ is a lower alkyl radical and $R_2$ and $R_3$ are radicals selected from the group consisting of lower alkyl and phenyl and M is a metallic element selected from the group consisting of cadmium, zinc, calcium, magnesium, barium and sodium.

23. A compound having the formula

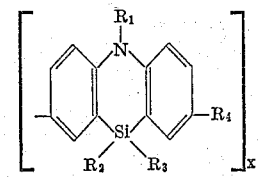

where $R_1$ is a lower alkyl radical and $R_2$ and $R_3$ are radicals selected from the group consisting of lower alkyl and phenyl, $R_4$ is a lower alkylene radical and $x$ ranges from 2–50.

24. A compound in accordance with claim 23 wherein $R_1$ is ethyl, $R_2$ and $R_3$ are phenyl, $R_4$ is ethylene and $x$ is 30.

References Cited in the file of this patent
UNITED STATES PATENTS 3,079,414    Tamborski et al. _____ Feb. 26, 1963

OTHER REFERENCES

Gilman et al.: "Jour. Organic Chem.," volume 24, September 1959, pp. 1394–5.

Gilman et al.: "Jour. Organic Chem.," volume 26, September 1961, pp. 3481–4.

Gilman, et al.: "Jour. Am. Chem. Soc.," vol. 79 (1957), pp. 6339–40.

Gilman et al.: "Chemistry and Industry," 1958, pp. 1227–8.